(12) United States Patent
Bauer et al.

(10) Patent No.: US 8,454,447 B2
(45) Date of Patent: Jun. 4, 2013

(54) TORQUE TRANSFER DEVICE OF A MOTOR VEHICLE

(75) Inventors: Thomas Bauer, Grossbardorf (DE); Martin Bremer, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 66 days.

(21) Appl. No.: 12/866,640

(22) PCT Filed: Feb. 5, 2009

(86) PCT No.: PCT/EP2009/051317
§ 371 (c)(1),
(2), (4) Date: Aug. 6, 2010

(87) PCT Pub. No.: WO2009/098255
PCT Pub. Date: Aug. 13, 2009

(65) Prior Publication Data
US 2010/0322742 A1    Dec. 23, 2010

(30) Foreign Application Priority Data

Feb. 9, 2008 (DE) .......................... 10 2008 008 412

(51) Int. Cl.
*F16D 3/72* (2006.01)

(52) U.S. Cl.
USPC .......................................................... 464/99

(58) Field of Classification Search
USPC .................................... 464/98, 99; 192/200
See application file for complete search history.

(56) References Cited

U.S. PATENT DOCUMENTS

| | | | | |
|---|---|---|---|---|
| 2,251,722 A * | 8/1941 | Thomas | | 464/98 |
| 4,523,916 A | 6/1985 | Kizler et al. | | |
| 5,221,232 A | 6/1993 | Nameny | | |
| 5,938,533 A * | 8/1999 | Watanabe | | 464/98 |
| 6,131,486 A * | 10/2000 | Doman | | 192/200 |
| 6,692,362 B2 * | 2/2004 | Drees et al. | | 464/98 |
| 7,770,471 B2 * | 8/2010 | Lohr et al. | | |
| 2001/0006141 A1 * | 7/2001 | Sturmer et al. | | 192/200 |
| 2002/0006831 A1 | 1/2002 | Aoki et al. | | |
| 2002/0128075 A1 * | 9/2002 | Ross | | 464/98 |

(Continued)

FOREIGN PATENT DOCUMENTS

| | | |
|---|---|---|
| DE | 32 22 119 | 10/1983 |
| DE | 38 27 249 | 2/1989 |
| DE | 101 27 653 | 1/2002 |
| DE | 10 2005 050 506 | 2/2007 |
| DE | 10 2008 008 412 | 8/2009 |
| FR | 2 878 302 | 5/2006 |

OTHER PUBLICATIONS

Mechanical Engineering Design, 7th ed. New York, McGraw-Hill, 2004. p. 396. TJ230.S5 2004.*

*Primary Examiner* — Gregory Binda
*Assistant Examiner* — Matthieu Setliff
(74) *Attorney, Agent, or Firm* — Cozen O'Connor

(57) ABSTRACT

A torque transmission device of a motor vehicle which transmits torque from an internal combustion engine to a torque converter, wherein the torque transmission device includes transmission part connected to the torque converter in a first radius region having a quantity of fastening elements lying on a first radius and connected to the internal combustion engine in a second radius region having a quantity of fastening elements lying on a second radius. To reduce loading of the fastening elements, the transmission part is provided with recesses in the first radius region and/or in the second radius region that extend at least partially over the first or second radius region and lessen the axial rigidity of the transmission part.

3 Claims, 9 Drawing Sheets

U.S. PATENT DOCUMENTS

| | | | |
|---|---|---|---|
| 2006/0211501 A1* | 9/2006 | Corey | 464/99 |
| 2008/0096674 A1 | 4/2008 | Pueschel et al. | |
| 2009/0098944 A1* | 4/2009 | Weigand | 464/99 |
| 2011/0250975 A1* | 10/2011 | Avins | 464/98 |

* cited by examiner

TORQUE TRANSFER DEVICE OF A MOTOR VEHICLE

PRIORITY CLAIM

This is a U.S. national stage of Application No. PCT/EP2009/051317, filed on Feb. 5, 2009, which claims priority to German Application No: 10 2008 008 412.3, filed: Feb. 9, 2008 the contents of which are incorporated herein by reference.

BACKGROUND OF THE INVENTION

1. Field of the Invention

The invention is directed to a torque transmission device of a motor vehicle transmits torque from an internal combustion engine to a torque converter, wherein the torque transmission device comprises a disk-shaped or ring-shaped transmission part connected to the torque converter in a first radius region having a quantity of fastening elements lying on the first radius and which is connected to the internal combustion engine in a second radius region having a quantity of fastening elements lying on the second radius.

2. Related Art

A torque transmission device of the type mentioned above is known from DE 10 2005 050 506 A1, where a transmission part (referred to as a disk-spring-like intermediate element) made of spring sheet metal transmits the torque from an internal combustion engine to a torque converter. The transmission part is fastened to a flange of the internal combustion engine and to a cover of the torque converter by screws. Rivets are often also used for fastening in a device of this kind. In the solution cited above, the transmission part has a substantially uninterrupted annular shape.

The screw connection or rivet connection by which the transmission part is fastened to the engine and converter is loaded by the loads to be transmitted. Because of the substantially uninterrupted annular shape of the transmission part, the connection plate is relatively dimensionally stable so that relative movements between the transmission part and the converter result in heavy loading of the rivet connection or screw connection by which the transmission part is fastened to the cover of the torque converter. Particularly troublesome in this regard is the expansion of the converter due to static and dynamic forces because of centrifugal force, oil pressures, and therefore, also its expansion in axial direction. Further, other loads apart from the torque to be transmitted include those resulting from axial loads, axial offset and crankshaft bending. As a result of these loads, the connection elements can become loose and, consequently, can be destroyed.

SUMMARY OF THE INVENTION

It is an object of the invention to develop a torque transmission device and, specifically, its ring-shaped or disk-shaped transmission part, such that the above-mentioned loading of the fastening elements, particularly the rivets, primarily due to the expansion of the converter has a less damaging influence on the fastening elements. Accordingly, an aim is to reduce the loading of the rivets, particularly in the event of expansion of the converter and in case of heavy loads to be transmitted.

Accordingly to one embodiment of the invention, the transmission part (i.e., the connection plate) is provided with recesses in the first radius region and/or in the second radius region, which recesses extend at least partially over the first or second radius region and locally mitigate the axial rigidity of the transmission part.

These recesses are arranged in the transmission part in addition to bore holes through which the fastening elements extend.

The fastening elements are preferably rivets which extend through bore holes in the transmission part.

The first and/or second radius region extend(s) radially preferably between 100% and 400% of the diameter of the bore holes in the transmission part which are provided for inserting the fastening elements.

A quantity of fastening elements is preferably arranged equidistant from one another around the circumference of the transmission part.

According to one embodiment of the invention, the recesses are formed as notches that extend from the radially inner edge of the transmission part between two fastening elements into the first and/or second radius region. The notches can extend at least up to the radius of the fastening elements. Further, the notches can be formed in such a way that an annular material area remains around the bore holes in the transmission part. The annular material area can extend around a circumferential angle of at least 180°. The quantity of notches preferably corresponds to the quantity of fastening elements.

According to one embodiment of the invention, the recesses are formed as punchouts or cutouts that surround the fastening elements and bore holes in an arc-shaped manner over a circumferential area. The punchouts or cutouts are preferably at a distance from the radially inner edge of the transmission part. They can extend over a circumferential area between 60° and 180°. Further, the punchouts or cutouts can be widened in their end areas.

In one embodiment of the invention, the recesses are formed as notches that extend from the radially outer edge of the transmission part between two fastening elements into the first and/or second radius region. Analogously, the notches can extend at least up to the radius of the fastening elements. Further, the notches can be formed such that an annular material area remains around the bore holes in the transmission part. In this case, too, the annular material area can extend around a circumferential angle of at least 180°. Further, the quantity of notches can again correspond to the quantity of fastening elements.

Further, the recesses can be formed as punchouts or cutouts arranged between the fastening elements or bore holes. They can be arranged at a distance from the radially outer edge of the transmission part. Further, the punchouts or cutouts can have a substantially triangular shape considered in axial direction. Their corner areas can be rounded.

The transmission part is preferably made of sheet metal.

Accordingly, the invention suggests that the ring-shaped or disk-shaped transmission part i.e., connection plate, is designed so as to be flexible in the area of the rivet connection by a special shaping. In this way, the connection areas of the respective connection plate that are provided for receiving a rivet in each instance can adjust themselves under load, e.g., due to the expansion of the converter, such that the rivet area itself is appreciably relieved.

The geometric shaping of the transmission part particularly in the area of the connection elements reduces the loading of the connection elements during operation. The deformation-dependent forces are already reduced in the transmission part itself before they can reach the connection elements. This is achieved by deliberately increasing flexibility in the transmission part.

As regards the geometric shaping of the connection areas of the connection plate, a reasonable compromise is found between improved flexibility of the connection area and its ability to transmit a torque as well as the other loads mentioned above because, otherwise, the individual connection areas run the risk of damage when acted upon by torque or by the other loads mentioned above.

The proposed solution can be used in different constructional types of torque transmission devices. In one embodiment the connection plate is connected to a flex plate in the radially outer area. Accordingly, the riveting is provided at the radially inner side of this connection. In an alternative solution, a connection plate through which a transverse shaft can be inserted is guided from the radial inner side to the rivet connection so that the shaping of the connection plate for increasing flexibility is provided on the radially outer side.

In this way, a durable connection is provided between the transmission part (connection plate) and the converter particularly when a rivet connection is used, and stresses occurring in the rivet connection are reduced by the geometric shaping of the transmission part particularly in the area of the rivet connection.

DETAILED DESCRIPTION OF THE DRAWINGS

Figure 1:
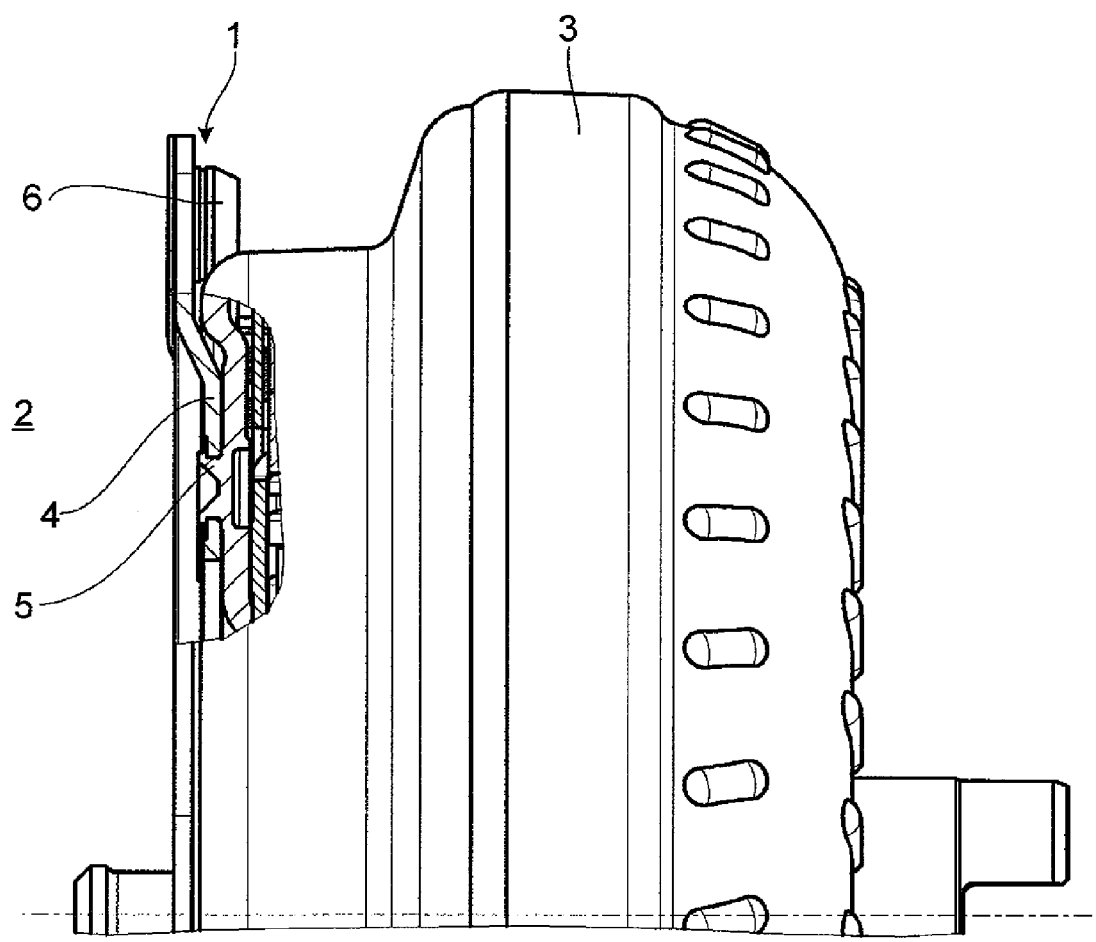
FIG. 1 is a side view of a portion of a drivetrain of a motor vehicle, shown in partial section, with a disk-shaped or ring-shaped transmission part (connection plate) fastened to a torque converter.

FIG. 1 shows a section of the drivetrain of a motor vehicle. An internal combustion engine 2 (at left) which is not shown in more detail is connected to a torque converter 3 by a torque transmission device 1 such that torque can be transmitted from the internal combustion engine 1 to the converter 3. The torque transmission device 1 comprises a disk-shaped or ring-shaped transmission part 4 which is also referred to as a connection plate.

Figure 2:
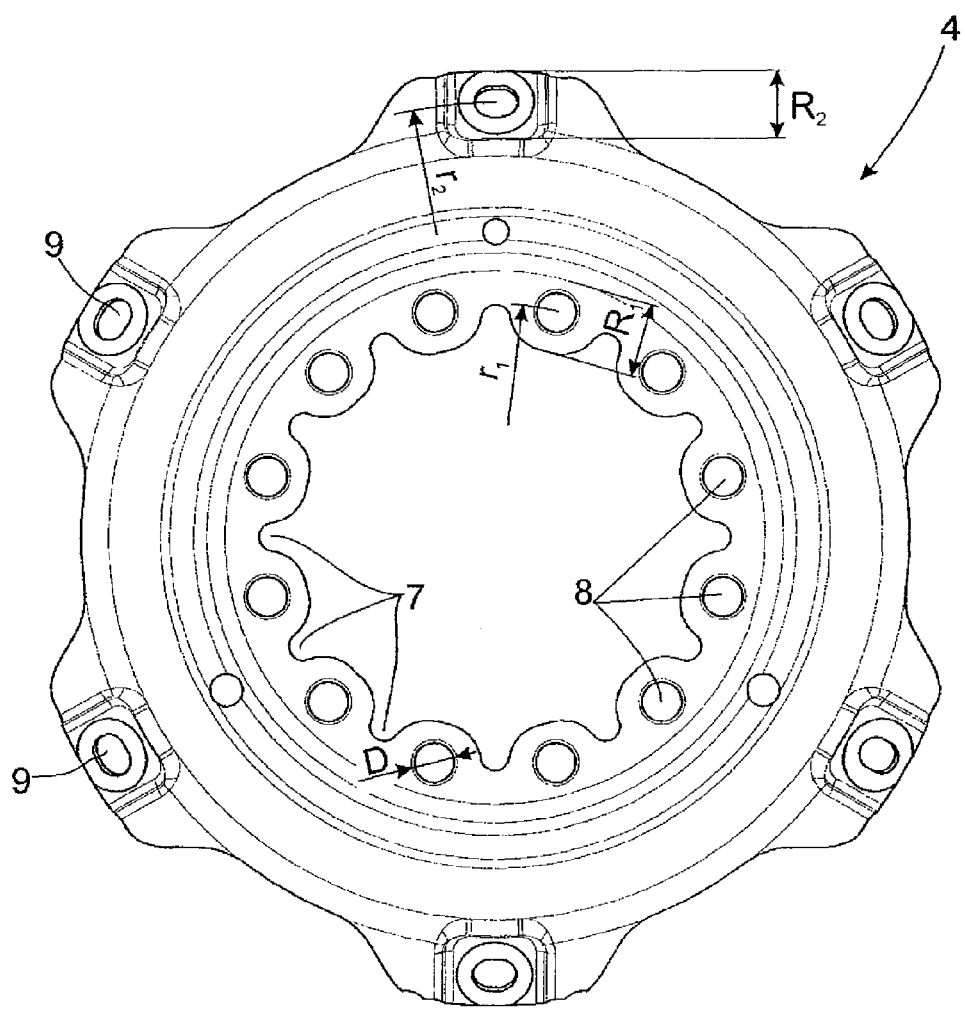
FIG. 2 is the disk-shaped or ring-shaped transmission part in a front view (considered in axial direction) according to a first embodiment form of the invention.

As can be seen from a comparison with FIG. 2, the transmission part 4 is fastened to the converter 3 and to the internal combustion engine 1 by fastening elements 5 and 6. In the present case, fastening elements 5 are rivets and fastening elements 6 are screws that pass through bore holes 8 and 9 in the transmission part 4 to secure the transmission part 4 to the internal combustion engine 1 and converter 3. As can be seen, the bore holes 8 for the rivets 5 lie on a first radius $r_1$, while the bore holes 9 for the screws 6 lie on a second radius $r_2$.

Radii $r_1$ and $r_2$ need not necessarily be different.

The bore holes 8 and 9, respectively, have a respective diameter D on the basis of which a radius region can be defined which is designated by $R_1$ and $R_2$, respectively, in the drawings, i.e., a certain annular surface area extending in radial direction over areas $R_1$ and $R_2$. The special geometric shapes (recesses) of the transmission part 4 to be described in the following lie in at least one of these radius regions $R_1$ and $R_2$. The radius regions $R_1$ and $R_2$ preferably extend over about 100% to 400% of the diameter D of the bore holes 8, 9.

As can already be seen, the transmission part 4 is provided with recesses 7 in the first radius region $R_1$ (and/or in the second radius region $R_2$). These recesses 7 extend over at least a portion of the radius region $R_1$ ($R_2$) and, as a result, the axial rigidity of the transmission part 4 is decreased. Because of this, in the event of deformations of the converter housing these deformations are not conveyed directly to the rivets or screws 5, 6, but rather are compensated in the transmission part 4 itself. Accordingly, the rivets or screws are less heavily loaded, which makes them longer-lasting.

Figure 3:
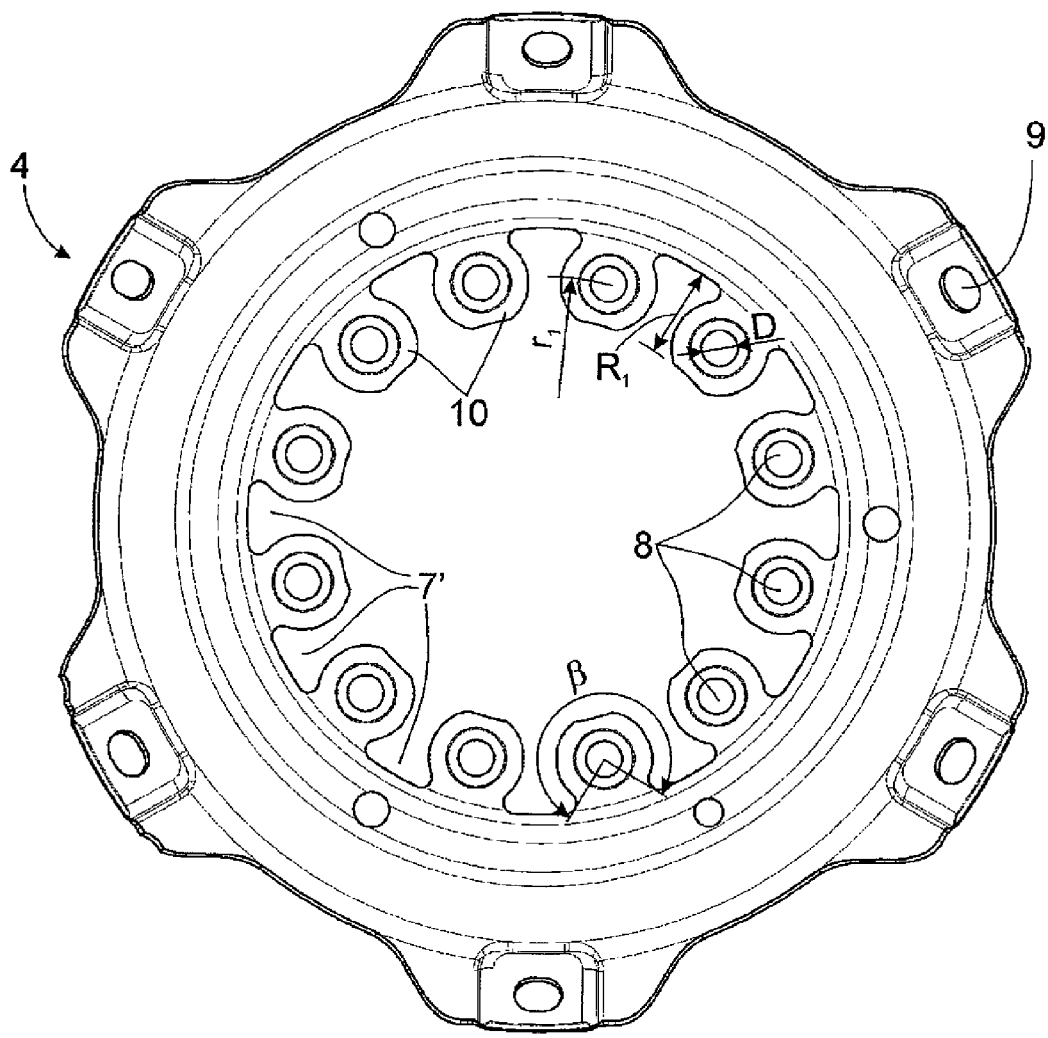
FIG. 3 is the disk-shaped or ring-shaped transmission part in a view corresponding to FIG. 2.
Figure 4:
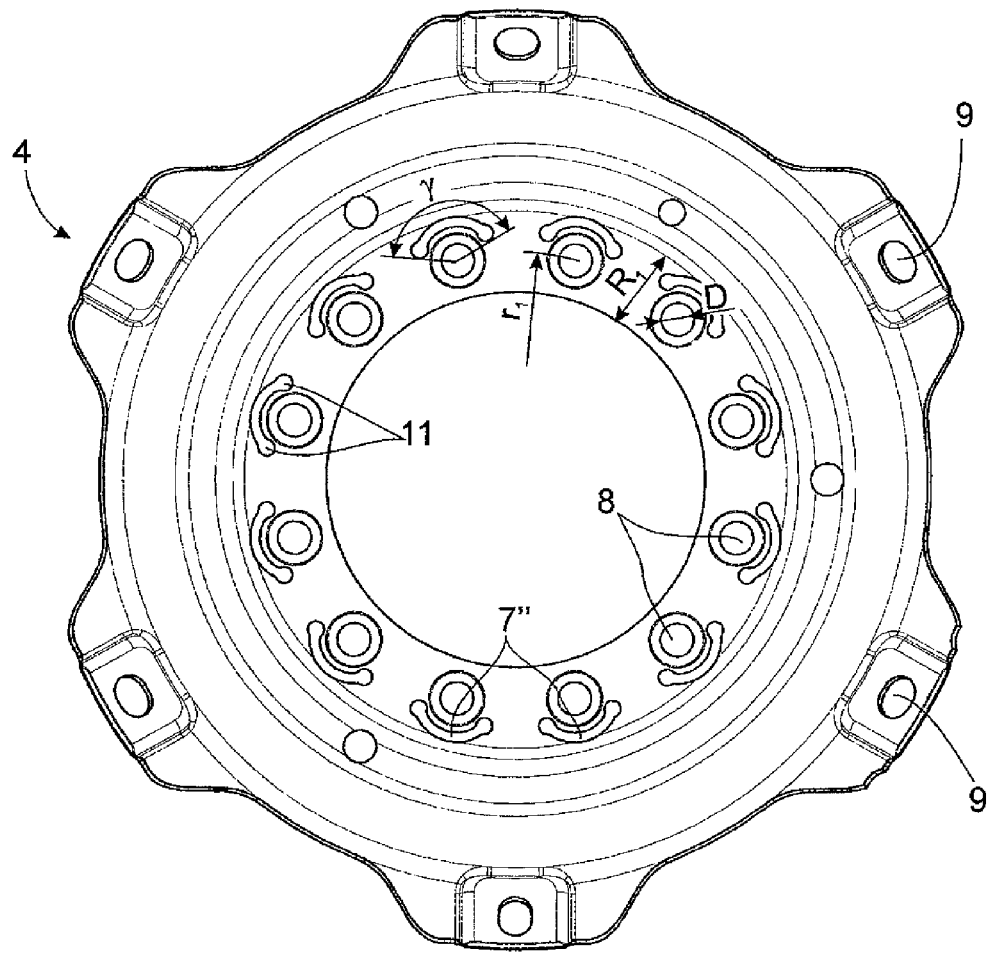
FIG. 4 is the disk-shaped or ring-shaped transmission part in a view corresponding to FIG. 2.

FIGS. 2 to 4 show various possibilities for shaping the recesses 7.

In FIG. 2, the recesses 7 extend between two rivets 5 or bore holes 8 from the radially inner edge of the transmission part 4 approximately to radius $r_1$.

In the solution according to FIG. 3, however, the recesses 7' are more pronounced. They extend farther radially and almost separate the individual portions with the bore holes 8 so that only an annular material area 10 remains which—as is shown in FIG. 3—extends around a circumferential angle β of about 270°.

FIG. 4 is another alternative shaping of the notches 7 in which the notches 7" are constructed as punchouts extend in an arc-shaped manner around the bore hole 8. In an analogous manner, these notches 7" can also be cutouts which are fashioned by laser cutting. The recess 7" extends around a circumferential area which is indicated in FIG. 4 by angle γ and which is approximately 150° in the present instance. A widening 11 can reduce notch stresses is arranged in the end areas of the recess 7".

Figure 5:
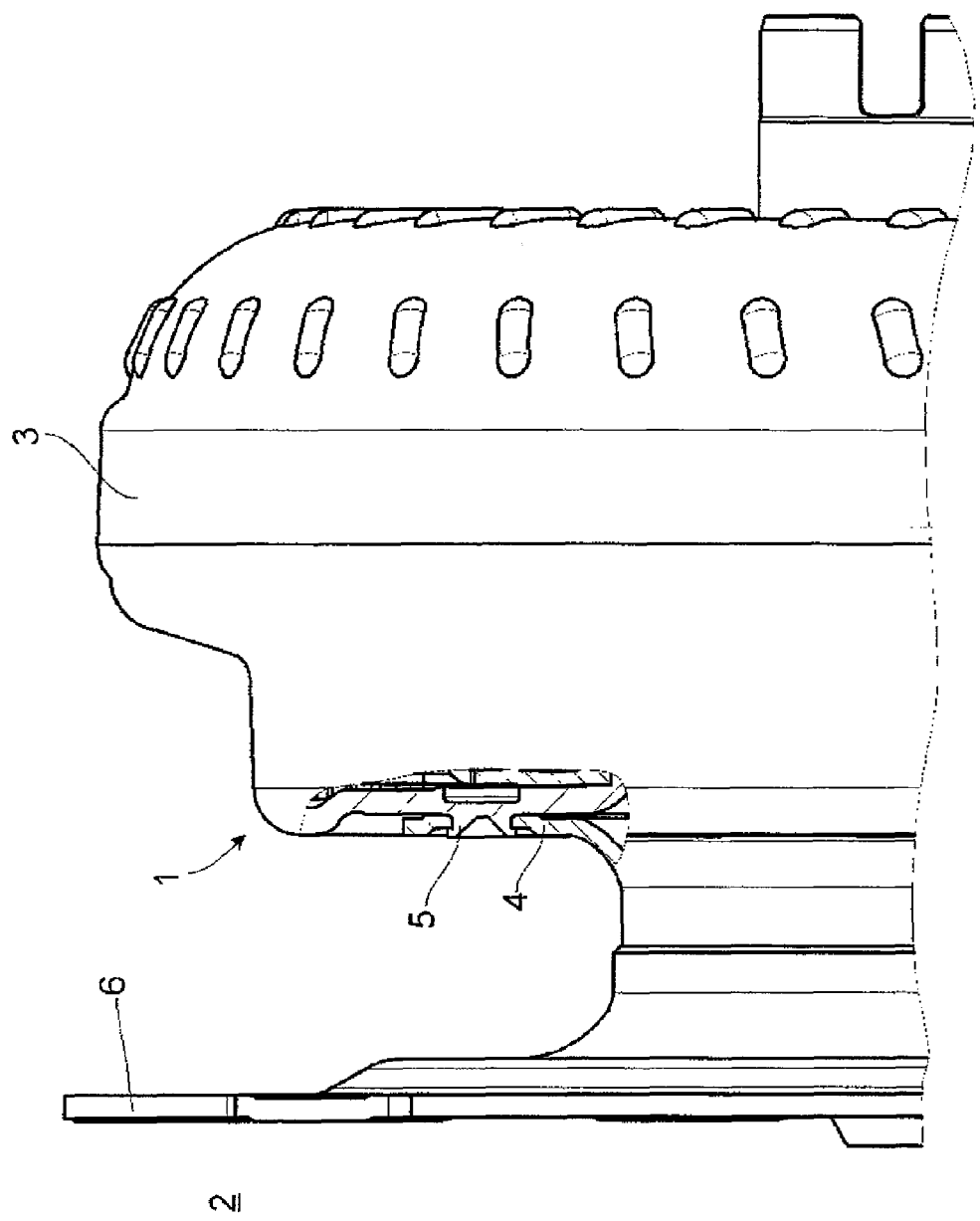
FIG. 5 is an alternative construction of the drivetrain, again in partial section, corresponding to the view in FIG. 1.

FIG. 5 shows an alternative construction of the drivetrain. In this case, a connection plate 4 through which a transverse shaft can pass is provided and is guided from the radially inner side to the rivet connection 5 so that the notches 7 which increase flexibility are provided in the transmission part 4 on the radially outer side. This is shown in more detail in FIGS. 6 to 9.

Figure 6:
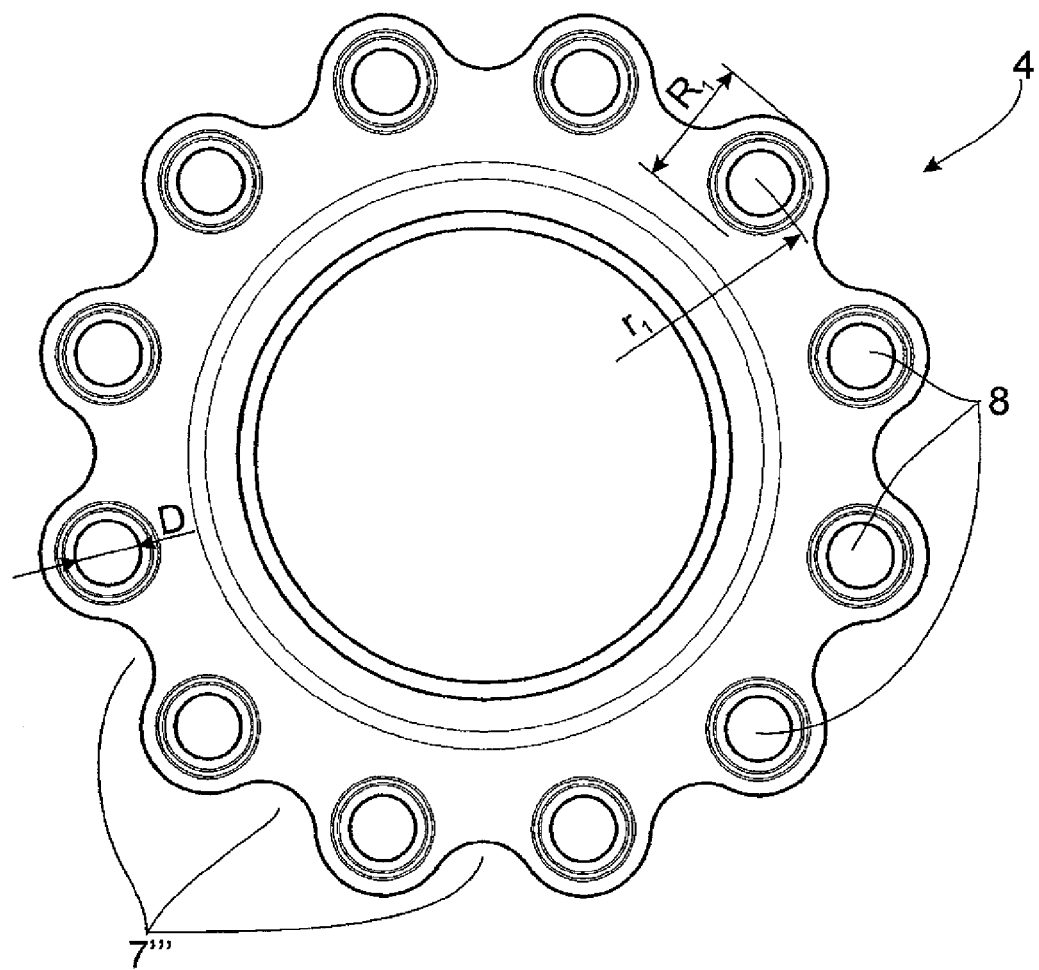
FIG. 6 is the disk-shaped or ring-shaped transmission part in a view corresponding to FIG. 2.

Analogous to the solution according to FIG. 2, FIG. 6 shows that the notches 7'''—in this case, coming from the radially outer side that extend until approximately the height of radius $r_1$.

Figure 7:
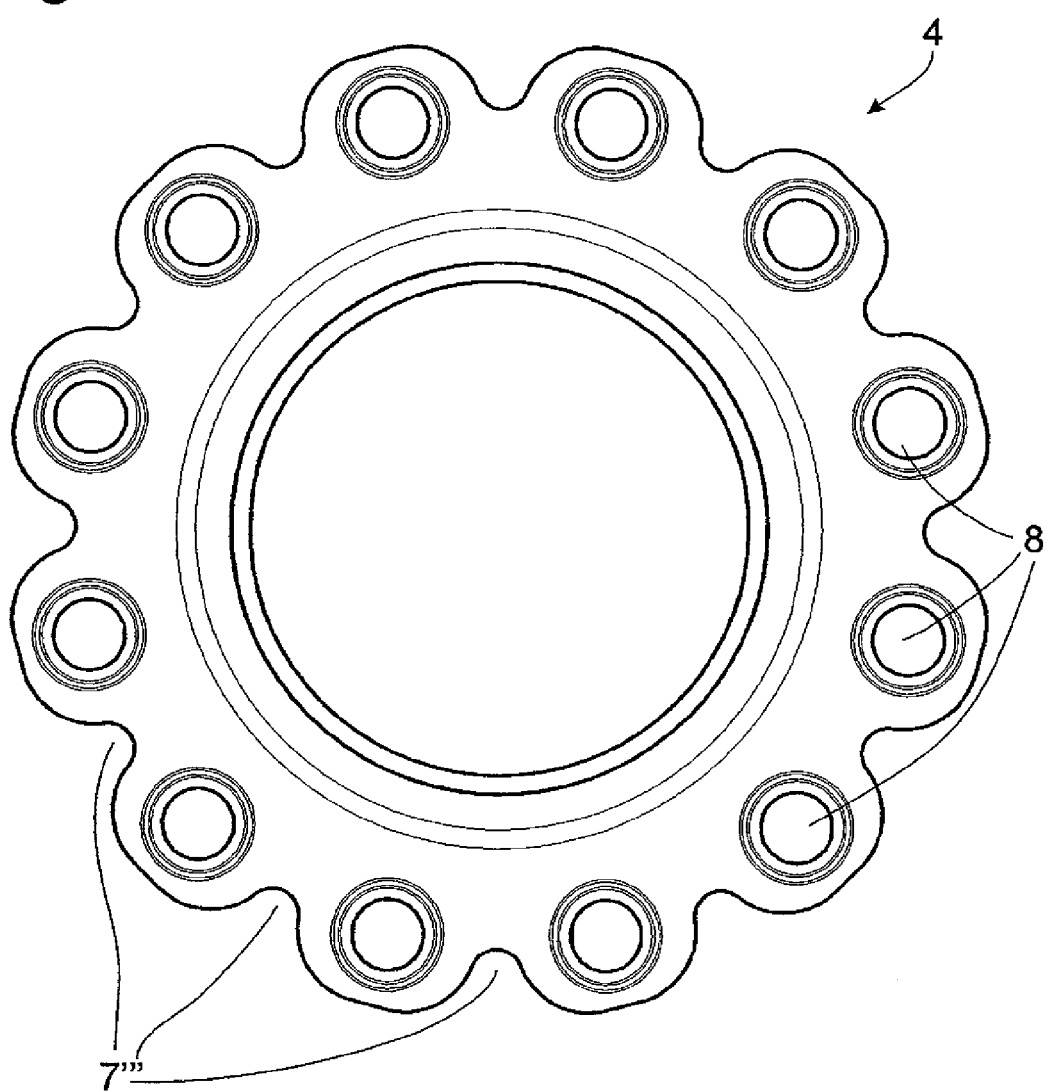
FIG. 7 is the disk-shaped or ring-shaped transmission part in a view corresponding to FIG. 2.

This is also shown in FIG. 7, although in this case the material areas surrounding the bore holes 8 are somewhat wider.

Figure 8:
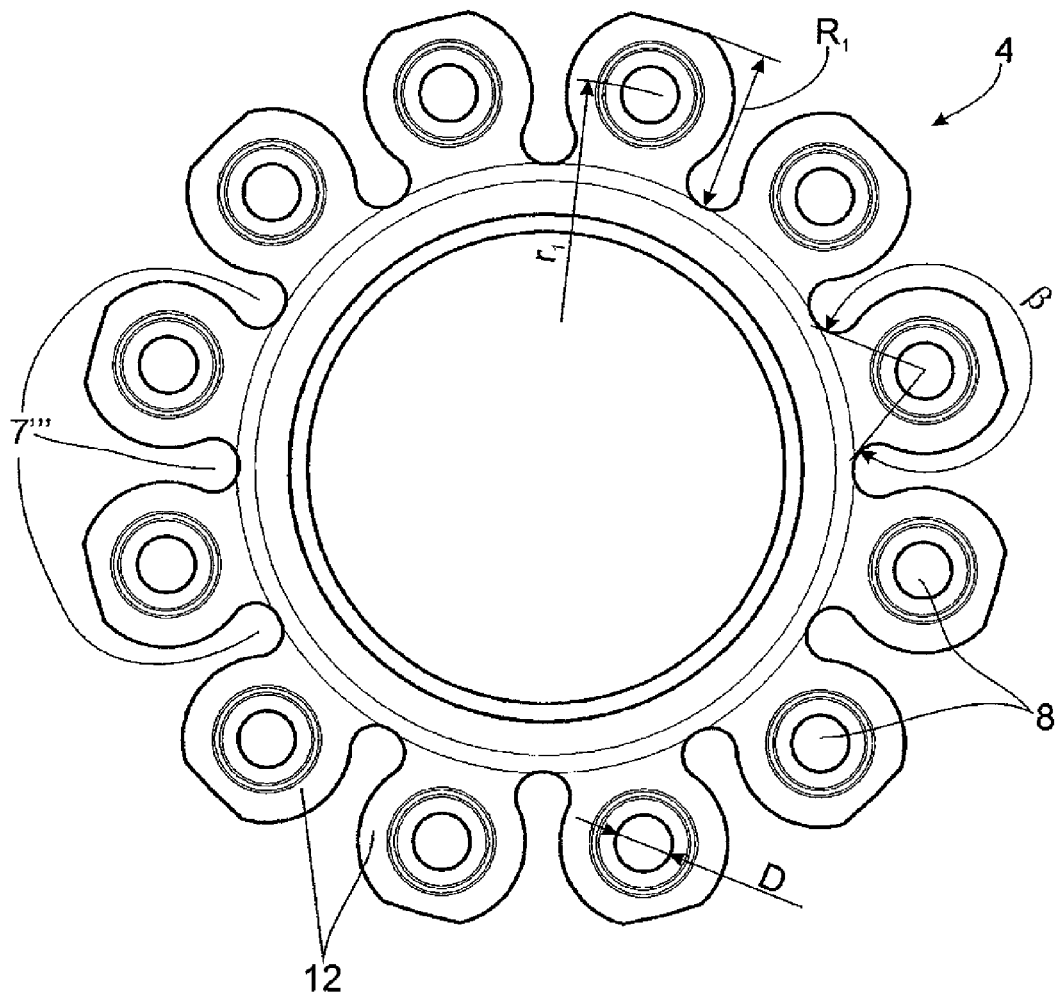
FIG. 8 is the disk-shaped or ring-shaped transmission part in a view corresponding to FIG. 2

The solution according to FIG. 8 corresponds to that shown in FIG. 3, i.e., the notches 7''' extend farther inward so that again only the annular material areas 12 remain around the bore holes 8.

Figure 9:
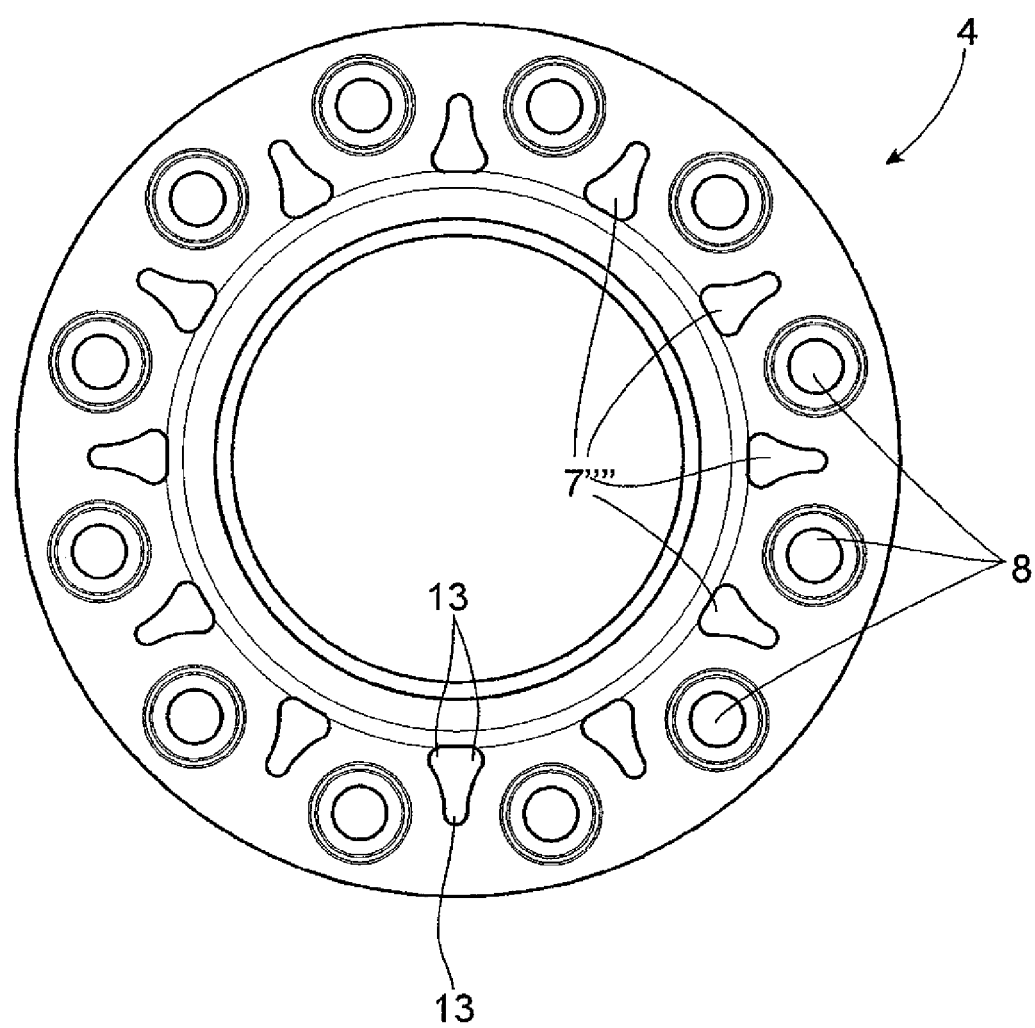
FIG. 9 is the disk-shaped or ring-shaped transmission part in a view corresponding to FIG. 2.

The solution according to FIG. 9 is constructed in a manner analogous to that in FIG. 4, i.e., in this case recesses 7'''' are incorporated (punched out or cut out) in the transmission part 4 and are surrounded on all sides by the material of the transmission part 4. While the recesses 7" were arc-shaped in the solution according to FIG. 4, the recesses 7'''' in the solution according to FIG. 9 are substantially triangular. The corner areas of the recesses 7'''' are rounded 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque transmission device for a motor vehicle configured to transmit torque from an internal combustion engine to a torque converter, the torque transmission device comprising:
   a transmission part that is configured to be:
      connected to the torque converter by one of a first disk-shaped portion and a first ring-shaped portion in a first circumferential region having a first quantity of first fastening elements arranged circumferentially on a first radius; and
      connected to the internal combustion engine by one of a second disk-shaped portion and a second ring-shaped portion in a second circumferential region having a second quantity of second fastening elements arranged circumferentially on a second radius;
   a substantially tubular portion configured so that a shaft can pass therethrough arranged between a first radially inner portion of the one of the first disk-shaped portion and the first ring-shaped portion and a second inner radial portion of the one of the second disk-shaped portion and the second ring-shaped portion; and
   a plurality of recesses configured to reduce an axial rigidity of the transmission part arranged in at least one of the first circumferential region and the second circumferential region and that extend at least partially over at least one of the first and the second circumferential regions;
   wherein the recesses are formed as notches that extend from the radial outer edge of the transmission part between two of the first or second fastening elements into at least one of the respective first and second circumferential regions to at least the radius of the respective first or second fastening elements;
   wherein the notches are formed such that an annular material area remains around the bore holes in the transmission part; and
   wherein the fastening elements are rivets that extend through bore holes in the transmission part.

2. The torque transmission device according to claim 1, wherein the annular material area extends around a circumferential angle of at least about 180°.

3. The torque transmission device according to claim 1, wherein the quantity of notches corresponds to a total quantity of the first and second fastening elements.

* * * * *